US012593867B2

(12) United States Patent
Lee et al.

(10) Patent No.: US 12,593,867 B2
(45) Date of Patent: Apr. 7, 2026

(54) VIBRATOR STRUCTURE, AND CARTRIDGE AND AEROSOL GENERATING DEVICE INCLUDING THE SAME

(71) Applicant: KT&G CORPORATION, Daejeon (KR)

(72) Inventors: Won Kyeong Lee, Gyeonggi-do (KR); Heon Jun Jeong, Seoul (KR); Jae Sung Choi, Gyeonggi-do (KR)

(73) Assignee: KT&G Corporation, Daejeon (KR)

( * ) Notice: Subject to any disclaimer, the term of this patent is extended or adjusted under 35 U.S.C. 154(b) by 434 days.

(21) Appl. No.: 17/794,100

(22) PCT Filed: Jan. 18, 2022

(86) PCT No.: PCT/KR2022/000936
§ 371 (c)(1),
(2) Date: Jul. 20, 2022

(87) PCT Pub. No.: WO2022/158832
PCT Pub. Date: Jul. 28, 2022

(65) Prior Publication Data

US 2024/0206533 A1 Jun. 27, 2024

(30) Foreign Application Priority Data

Jan. 22, 2021 (KR) ........................ 10-2021-0009521
Mar. 10, 2021 (KR) ........................ 10-2021-0031469

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/42* (2020.01); *B06B 1/0651* (2013.01); *B06B 2201/77* (2013.01)

(58) Field of Classification Search
None
See application file for complete search history.

(56) References Cited

U.S. PATENT DOCUMENTS 10,757,971 B2 9/2020 Liu et al.
2017/0119059 A1 5/2017 Zuber et al.
(Continued)

FOREIGN PATENT DOCUMENTS

CN 203762294 U 8/2014
CN 105559151 A 5/2016
(Continued)

OTHER PUBLICATIONS

English Machine Translation of WO 2020187138, obtained from PE2E Search (Clarivate Analytics) (Year: 2020).*
(Continued)

*Primary Examiner* — Philip Y Louie
*Assistant Examiner* — Charlotte Davison
(74) *Attorney, Agent, or Firm* — Foley & Lardner LLP

(57) ABSTRACT

A vibrator structure of an aerosol generating device is provided. The vibrator structure includes a vibrator configured to vibrate according to an electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from an external power source is transferred to the first electrode through the metal body.

12 Claims, 7 Drawing Sheets

(51) Int. Cl.
*A24F 40/42* (2020.01)
*B06B 1/06* (2006.01)

(56) References Cited

U.S. PATENT DOCUMENTS

| | | | | |
|---|---|---|---|---|
| 2018/0161525 | A1* | 6/2018 | Liu | B05B 17/0661 |
| 2018/0164134 | A1 | 6/2018 | Zhong et al. | |
| 2019/0223503 | A1 | 7/2019 | Liu et al. | |
| 2020/0253282 | A1 | 8/2020 | Liu et al. | |
| 2021/0076739 | A1 | 3/2021 | Dubiief et al. | |
| 2022/0022551 | A1 | 1/2022 | Inagaki et al. | |
| 2022/0086959 | A1 | 3/2022 | Mironov et al. | |
| 2022/0142246 | A1 | 5/2022 | Liu et al. | |
| 2024/0351059 | A1 | 10/2024 | Zuber et al. | |

FOREIGN PATENT DOCUMENTS

| | | | | | |
|---|---|---|---|---|---|
| CN | 108135274 | A | | 6/2018 | |
| CN | 109512035 | A | | 3/2019 | |
| CN | 111346779 | A | | 6/2020 | |
| CN | 111820455 | A | | 10/2020 | |
| EP | 3 689 164 | A1 | | 8/2020 | |
| KR | 10-2018-0064486 | A | | 6/2018 | |
| KR | 10-2018-0111845 | A | | 10/2018 | |
| KR | 10-2018-0122480 | A | | 11/2018 | |
| KR | 10-2019-0003719 | A | | 1/2019 | |
| KR | 20-0488466 | Y1 | | 4/2019 | |
| KR | 10-2060042 | B1 | | 12/2019 | |
| WO | 2017/137510 | A1 | | 8/2017 | |
| WO | WO-2020187138 | A1 | * | 9/2020 | A24F 40/05 |
| WO | 2020/209112 | A1 | | 10/2020 | |
| WO | WO-2020211721 | A1 | * | 10/2020 | |

OTHER PUBLICATIONS

English Machine Translation of WO 2020187138 A1, obtained from PE2E Search (Clarivate Analytics) (Year: 2020).*

English Machine Translation of WO 2020211721 A1, obtained from PE2E Search (Clarivate Analytics) (Year: 2020).*

Japanese Office Action issued Jul. 11, 2023, in Application No. 2022-551018.

Extended European Search Report issued May 22, 2023, in Application No. 22742808.3.

Written Opinion for PCT/KR2022/000936, dated Apr. 27, 2022.

International Search Report for PCT/KR2022/000936, dated Apr. 27, 2022.

Korean Office Action dated Oct. 24, 2022 in Korean Application No. 10-2021-0031469.

Office Action dated Dec. 26, 2024, received in Chinese Patent Application No. 202280002627.3.

* cited by examiner

[Fig. 1]
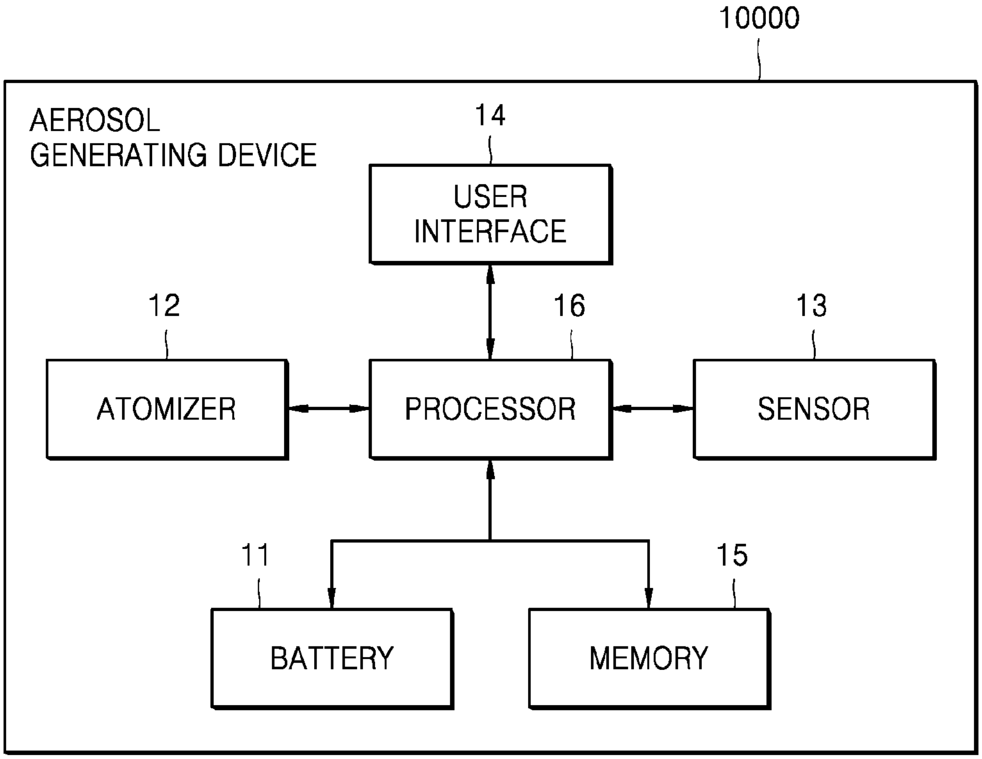

[Fig. 2]
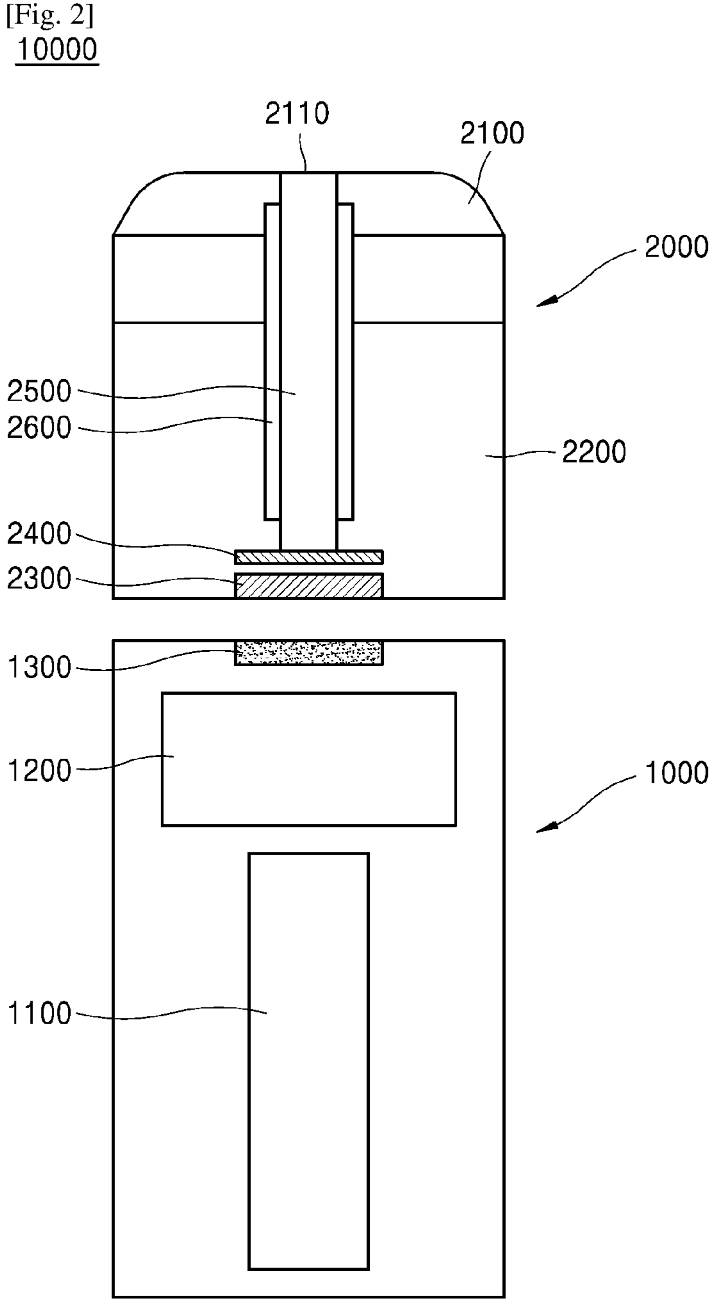

[Fig. 3A]
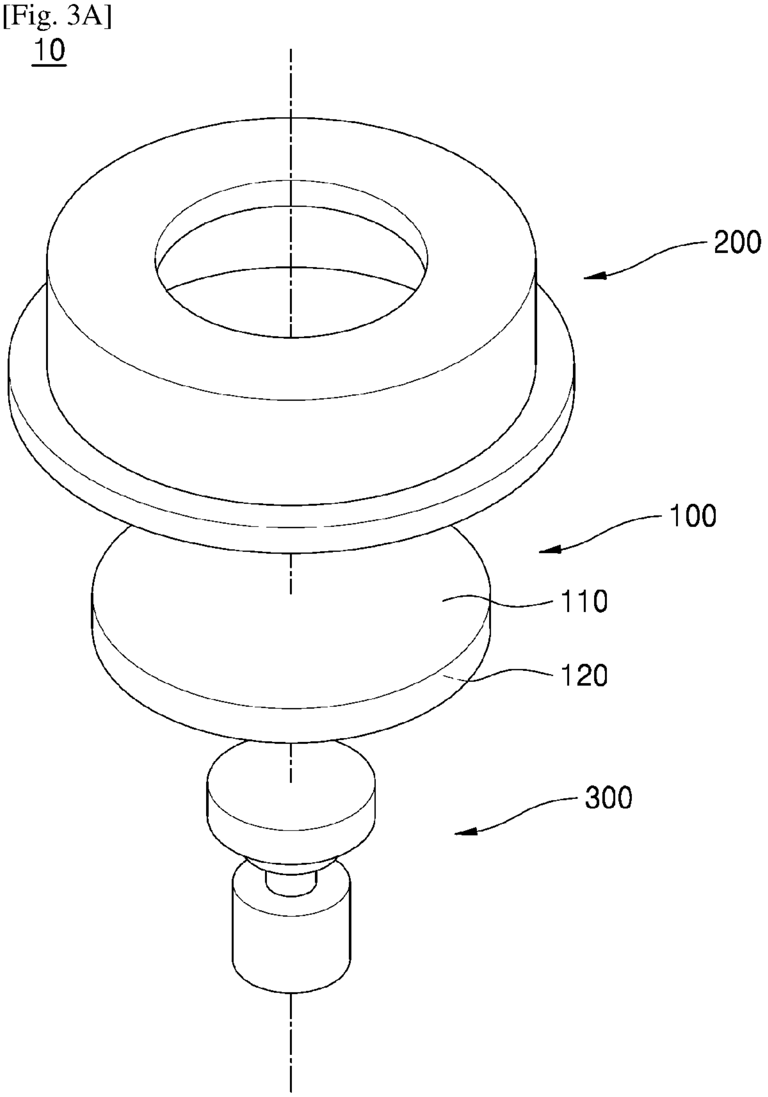
[Fig. 3B]
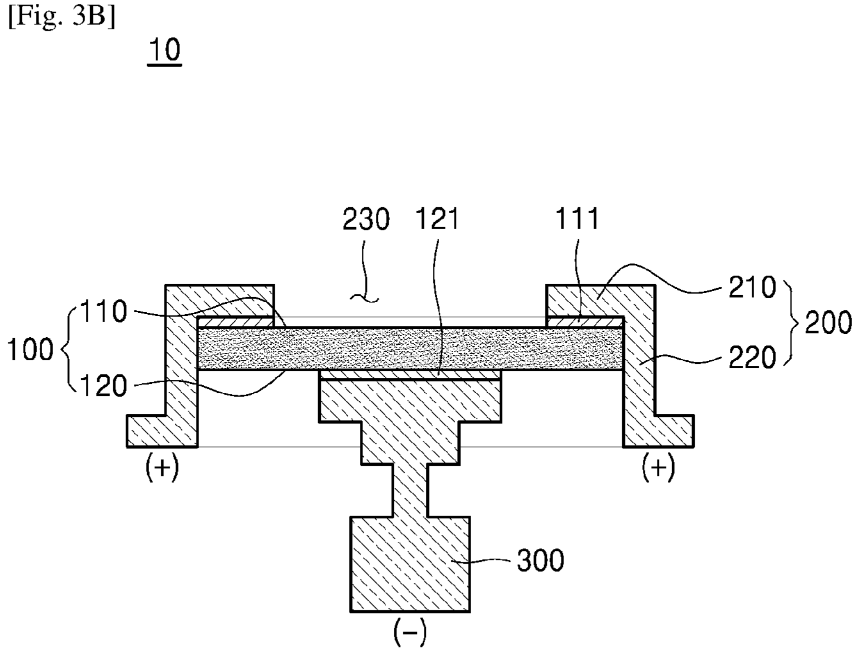

[Fig. 4A]
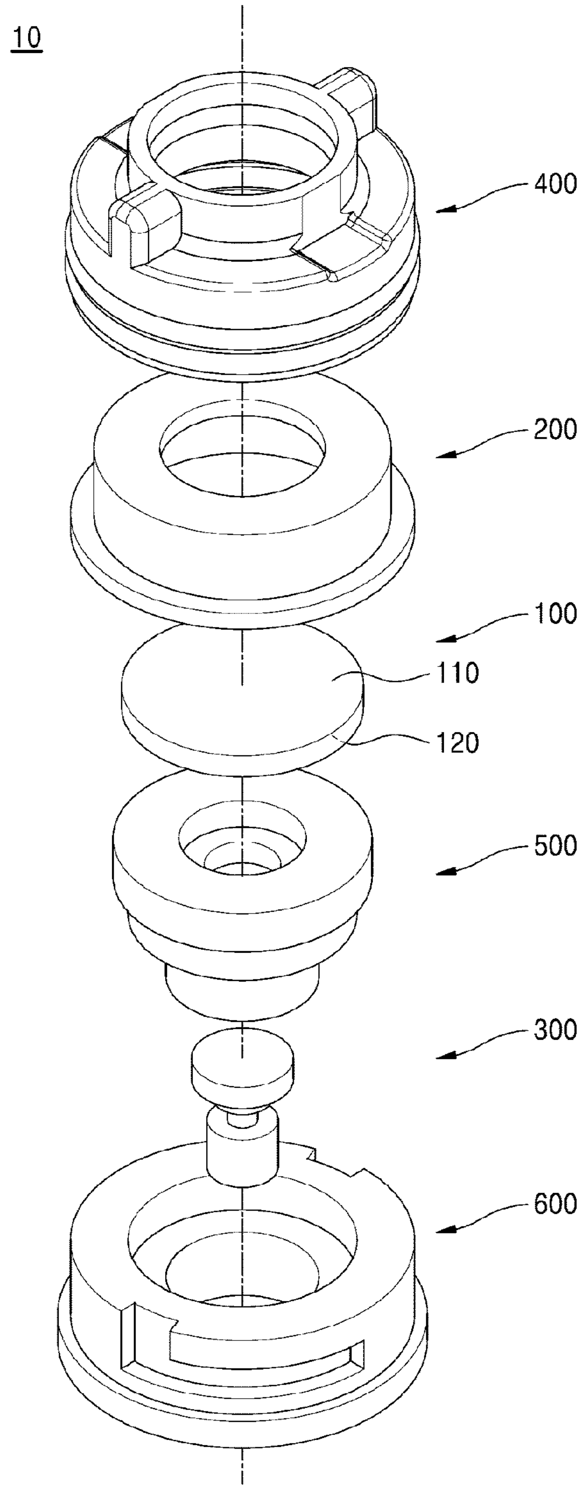

[Fig. 4B]
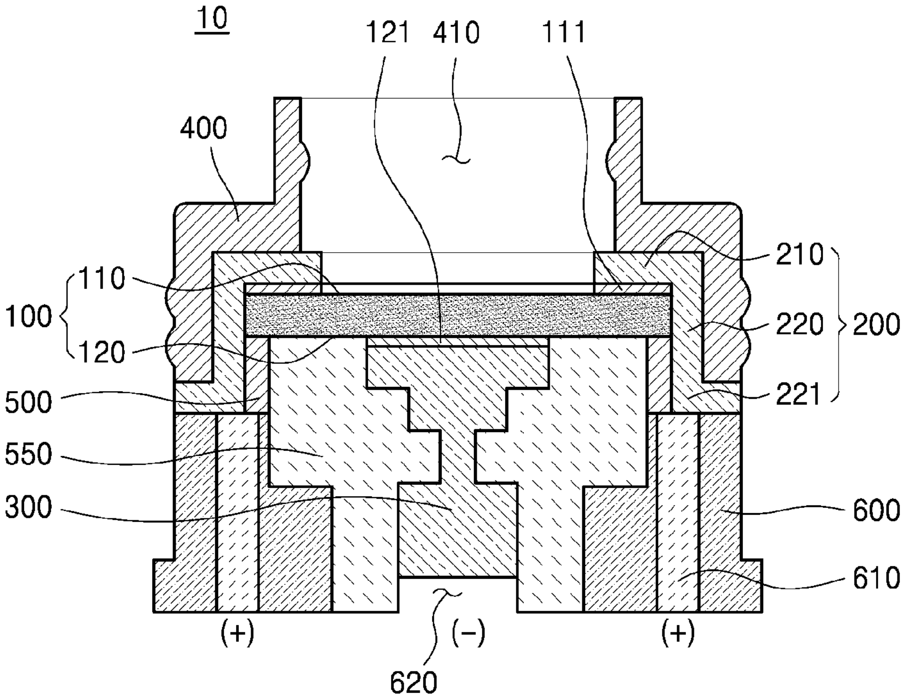
[Fig. 5]
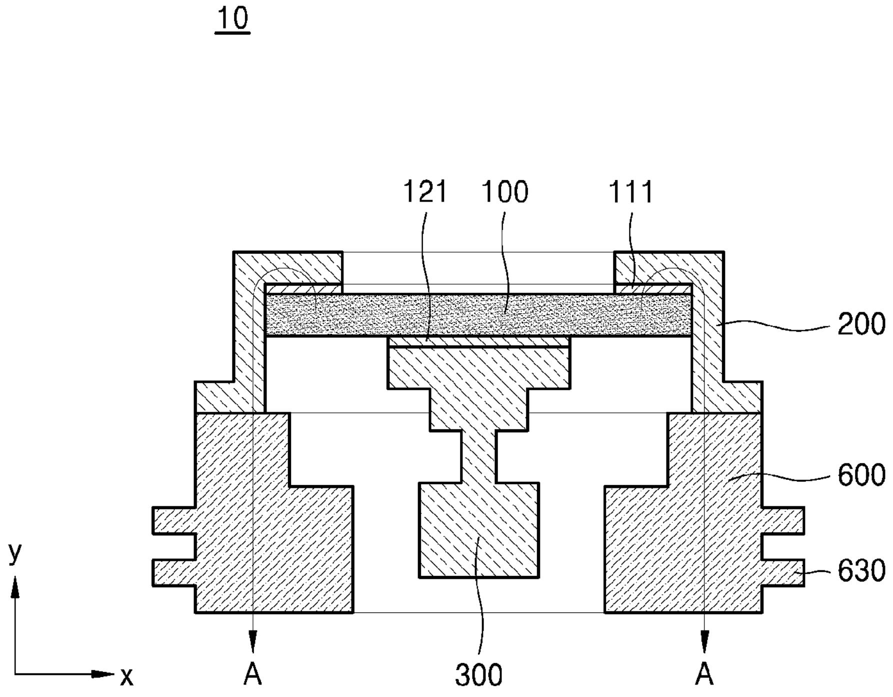

[Fig. 6A]
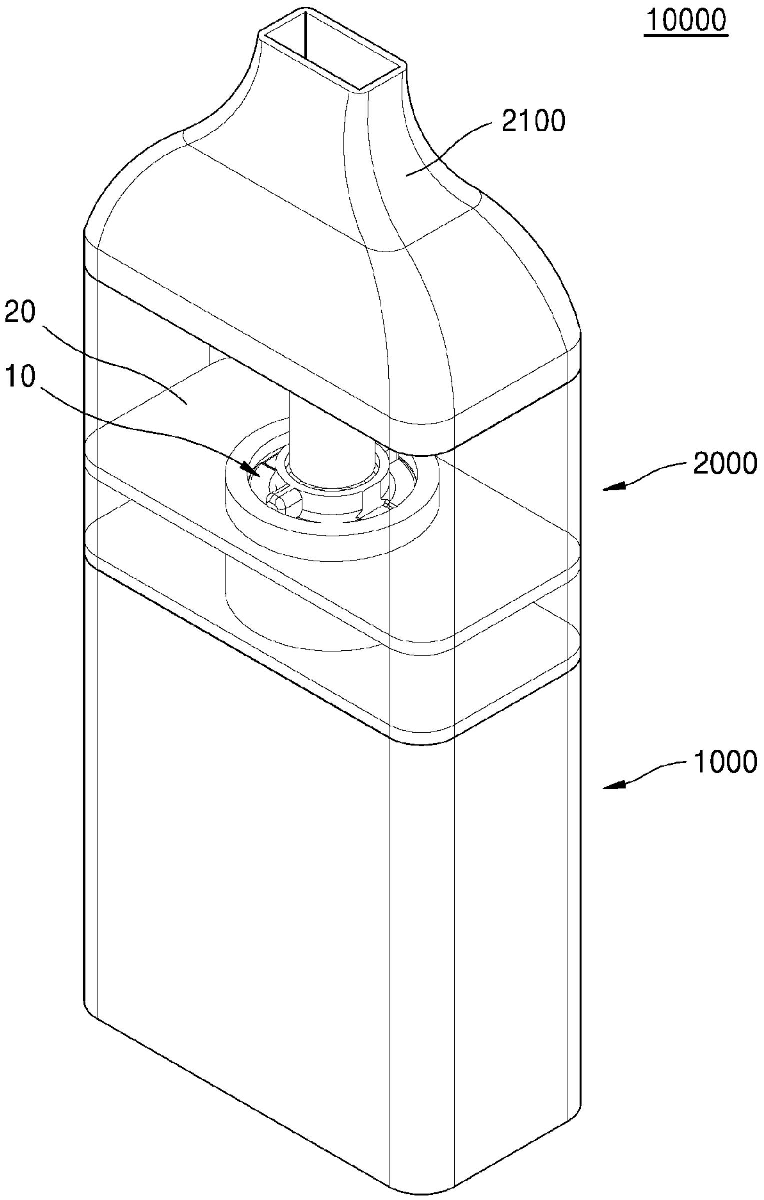

[Fig. 6B]
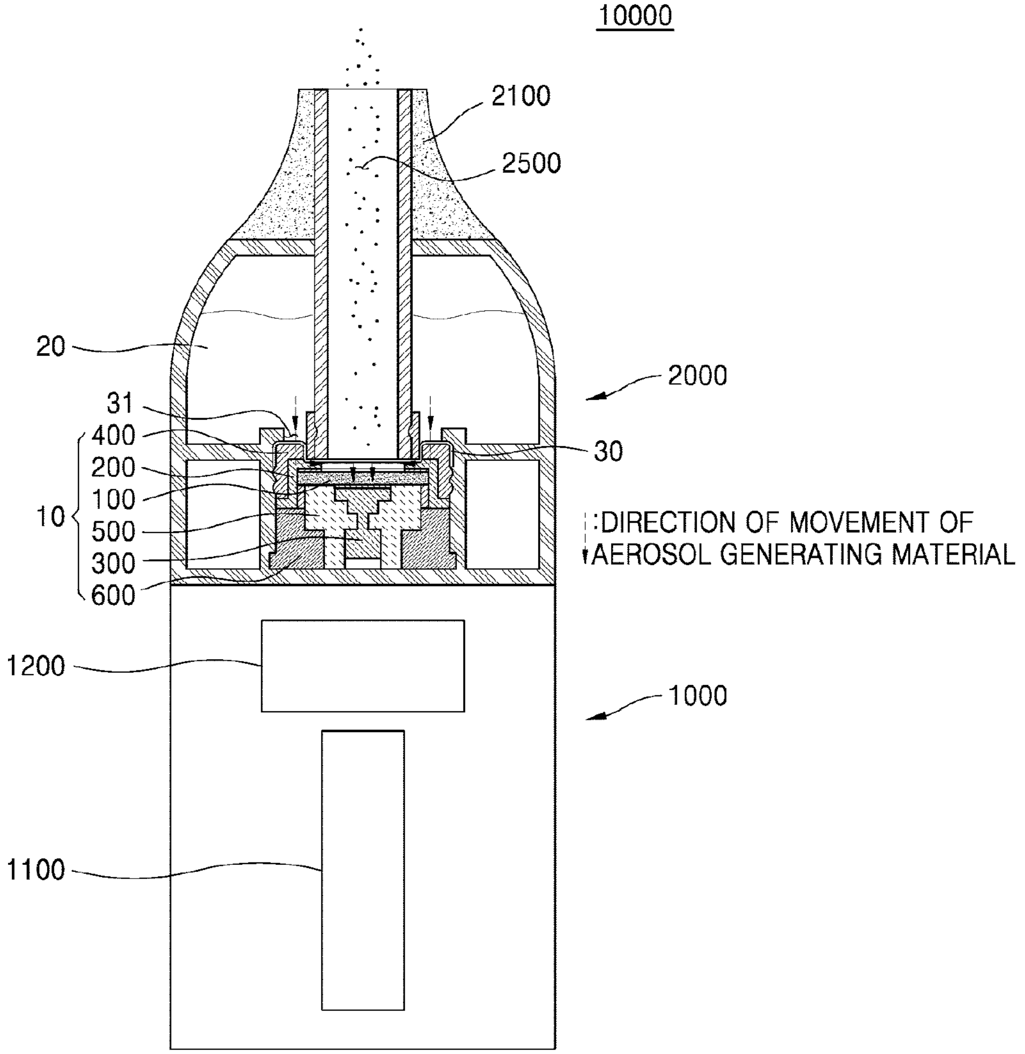

VIBRATOR STRUCTURE, AND CARTRIDGE AND AEROSOL GENERATING DEVICE INCLUDING THE SAME

CROSS REFERENCE TO RELATED APPLICATIONS

This application is a National Stage of International Application No. PCT/KR2022/000936 filed Jan. 18, 2022, claiming priority based on Korean Patent Application No. 10-2021-0009521 filed Jan. 22, 2021 and Korean Patent Application No. 10-2021-0031469 filed Mar. 10, 2021.

TECHNICAL FIELD

Embodiments relate to a vibrator structure for generating an aerosol, and a cartridge and aerosol-generating device including the vibrator structure.

BACKGROUND ART

Recently, there has been an increasing demand for an aerosol generating device that generates aerosol based on a non-combustion method without combustion of tobacco. For example, an aerosol generating device may deliver aerosol to the distal airway of a user by generating aerosol with a non-combustion method or by generating aerosol from aerosol generating material and having the aerosol pass through a flavor medium before outputting from the aerosol generating device.

The aerosol-generating material used in the aerosol-generating device may be in a flowing liquid state, a gel state, or a solid state such as a cigarette. This aerosol generating device may be used by supplying an aerosol generating material to an internal aerosol generating material reservoir, or may be used in combination with a cartridge containing the aerosol generating material. When the aerosol-generating material is exhausted, the aerosol-generating device may continue to be used by refilling the aerosol-generating material reservoir or replacing the cartridge with a new cartridge.

DISCLOSURE OF INVENTION

Technical Problem

Embodiments relate to assembling and disassembling a vibrator structure, and sim-plifying electrical wiring for applying electrical energy to a vibrator by modularizing the vibrator that vibrates an aerosol generating material to generate an aerosol.

In addition, the embodiments are provided to enable more stable and continuous operation of the vibrator by effectively dissipating heat generated from the vibrator due to continuously applied electrical energy.

Technical aspects, features and advantages to be achieved with respect to the embodiments are not limited to the above-described problems, and embodiments that are not mentioned in the disclosure will be clearly understood by one of ordinary skill in the art from the present disclosure and the accompanying drawings.

Solution to Problem

According to an embodiment, there is provided a vibrator structure including: a vibrator configured to vibrate according to an electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from an external power source is transferred to the first electrode through the metal body.

According to an embodiment, there is provided a cartridge including: a liquid storage unit; a wick for absorbing an aerosol generating material stored in the liquid storage unit; and a vibrator structure. The vibrator structure includes: a vibrator configured to vibrate according to an electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from an external power source is transferred to the first electrode through the metal body, and the vibrator structure atomizing the aerosol generating material supplied to the vibrator through the wick.

According to an embodiment, there is provided an aerosol generating device including: a cartridge including a liquid storage unit; a wick for absorbing an aerosol generating material stored in the liquid storage unit; a battery for applying an electrical energy to the cartridge; and a vibrator structure. The vibrator structure includes: a vibrator configured to vibrate according to the electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from the battery is transferred to the first electrode, and the vibrator structure atomizing the aerosol generating material supplied to the vibrator through the wick.

Advantageous Effects of Invention

In the vibrator structure according to the above-described embodiments, through modularization of the vibrator, electrical wiring for transmitting electrical energy to the vibrator can be simplified, and structural firmness and ease of disassembly and assembly can be secured.

In addition, heat generated from the vibrator can be effectively dissipated through the heat dissipation design including the thermally conductive material, so that the vibrator and the aerosol generating device including the vibrator can be continuously and stably used.

The one or embodiments of the disclosure are not limited to the embodiments described above, and it should be understood that one of ordinary skill in the art may practice the one or more embodiments based on the present disclosure and the accompanying drawings.

BRIEF DESCRIPTION OF DRAWINGS

FIG. 1 is a block diagram of an aerosol generating device according to an embodiment.

FIG. 2 is a view schematically showing an aerosol generating device according to an embodiment.

FIG. 3A is an exploded perspective view of a vibrator structure according to an embodiment.

FIG. 3B is a cross-sectional view of the vibrator structure of FIG. 3A.

FIG. 4A is an exploded perspective view of a vibrator structure according to another embodiment.

FIG. 4B is a cross-sectional view of the vibrator structure of FIG. 4A.

FIG. 5 is a diagram illustrating the flow of heat in a vibrator structure according to an embodiment.

FIG. 6A is a perspective view of an aerosol generating device including a cartridge, according to an embodiment.

FIG. 6B is a cross-sectional view of the cartridge part of FIG. 6A.

BEST MODE FOR CARRYING OUT THE INVENTION

According to an embodiment, there is provided a vibrator structure including: a vibrator configured to vibrate according to an electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from an external power source is transferred to the first electrode through the metal body.

The metal body includes a side wall forming a hollow for accommodating the vibrator and an upper electrode in contact with the first electrode.

The first electrode is arranged along an edge of the first surface, and the upper electrode protrudes from the sidewall in a direction toward a center of the first surface.

The second electrode is arranged at a position spaced apart from an edge of the second surface, and a lower electrode is accommodated in the hollow and is in contact with the second electrode.

The vibrator structure further includes: an elastic body coupled to the metal body to receive a vibration of the vibrator and absorb the vibration.

The elastic body includes a first elastic body coupled to an upper portion of the metal body and a second elastic body coupled to a lower portion of the metal body.

The metal body is coaxially coupled to the first elastic body and the second elastic body in a direction from the first surface toward the second surface of the vibrator.

The vibrator structure further includes: a pressing body in contact with at least a portion of the vibrator and the lower electrode of the vibrator.

The vibrator structure further includes: a support including a conductive unit electrically connected to the metal body and supporting the metal body.

The support further includes a through hole through which an external terminal and the lower electrode are connected.

The metal body includes a thermally conductive material receiving heat generated from the vibrator.

The support includes a thermally conductive material receiving heat generated from the vibrator.

The support further includes at least one cooling fin on a surface of the support.

According to an embodiment, there is provided a cartridge including: a liquid storage unit; a wick for absorbing an aerosol generating material stored in the liquid storage unit; and a vibrator structure. The vibrator structure includes: a vibrator configured to vibrate according to an electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from an external power source is transferred to the first electrode through the metal body, and the vibrator structure atomizing the aerosol generating material supplied to the vibrator through the wick.

According to an embodiment, there is provided an aerosol generating device including: a cartridge including a liquid storage unit; a wick for absorbing an aerosol generating material stored in the liquid storage unit; a battery for applying an electrical energy to the cartridge; and a vibrator structure. The vibrator structure includes: a vibrator configured to vibrate according to the electrical energy applied to the vibrator, the vibrator including a first surface and a second surface opposite to the first surface; a first electrode arranged on at least one region of the first surface; a second electrode arranged on at least one region of the second surface; and a metal body accommodating the vibrator and being in contact with at least one region of the first electrode, wherein the electrical energy applied from the battery is transferred to the first electrode, and the vibrator structure atomizing the aerosol generating material supplied to the vibrator through the wick.

MODE FOR THE INVENTION

The terms used in the embodiments are general terms currently and widely used in the art in consideration of functions with respect to the present disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the present disclosure should not be understood as simple names, but should be understood based on the meaning of the terms and the overall description of the present disclosure.

Throughout the specification, when a portion "includes" an element, another element may be further included, rather than excluding the existence of the other element, unless otherwise described. In addition, the terms "unit," "module," etc. described in the specification mean units for processing at least one function or operation and may be implemented by hardware components or software components or combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, embodiments of the present disclosure will be described more fully with reference to the accompanying drawings, in which non-limiting example embodiments of the present disclosure are shown such that one of ordinary skill in the art may easily work the present disclosure. Embodiments of the present disclosure may, however, be embodied in many different forms and should not be construed as being limited to the example embodiments set forth herein.

Terms such as "first" and "second" may be used to describe various components, but the components should not be limited by the terms. The terms are only used to dis-tinguish one component from another.

In addition, some of the components in the drawings may be illustrated with ex-aggerated sizes or proportions. In addition, the components shown in one figure may not be shown on another figure.

In addition, throughout the specification, the "longitudinal direction" of a component may be a direction in which the component extends along one axis of the component, and in this case, the one axis of the component may refer to a direction in which the component extends longer than the other axis transverse to the one axis. For example, the longitudinal direction may be a direction parallel to the y direction in FIG. 5.

Throughout the specification, the term "puff" refers to the user's inhalation, and the inhalation may refer to a situation in which air is drawn into the user's mouth, nasal cavity, or lungs through the user's mouth or nose.

Since various embodiments described in the specification are classified arbitrarily only for the purpose of explanation, the embodiments should not be construed to be exclusive to each other. For example, some features disclosed in one embodiment may be applied to or implemented in other embodiments.

Also, it is possible to change some features for applying or implement those features in other embodiments within scope and spirit of this disclosure. In the present disclosure, a singular form also includes a plural form unless specifically stated in otherwise.

Hereinafter, embodiments of the present disclosure will be described in detail with reference to the accompanying drawings.

FIG. 1 is a block diagram of an aerosol generating device according to an embodiment.

Referring to FIG. 1, an aerosol generating device 10000 may include a battery 11, an atomizer 12, a sensor 13, a user interface 14, a memory 15, and a processor 16. However, the aerosol generating device 10000 is not limited to the embodiment shown in FIG. 1. Depending on the design of the aerosol generating device 10000, it may be understood by those of ordinary skill in the art that some of the hardware components shown in FIG. 1 may be omitted or other components may be further added.

As an example, the aerosol generating device 10000 may include a body, and in this case the hardware elements included in the aerosol generating device 10000 are located in a main body.

As another embodiment, the aerosol generating device 10000 may include a main body and a cartridge, and hardware elements included in the aerosol generating device 10000 may be divided and located in the main body and the cartridge. Alternatively or additionally, at least some of the hardware elements included in the aerosol generating device 10000 may be located in each of the main body and the cartridge.

Hereinafter, the operation of each element is described without any spatial limitation on each element included in the aerosol generating device 10000.

The battery 11 supplies power to be used to operate the aerosol generating device 10000. That is, the battery 11 may supply power to enable the atomizer 12 to atomize the aerosol generating material. In addition, the battery 11 may supply power for the operation of other hardware elements included in the aerosol generating device 10000, that is, the sensor 13, the user interface 14, the memory 15, and the processor 16. The battery 11 may be a rechargeable battery or a disposable battery.

For example, the battery 11 may include a nickel-based battery (e.g., a nickel-metal hydride battery, a nickel-cadmium battery), or a lithium-based battery (e.g., a lithium-cobalt battery, a lithium-phosphate battery, a lithium titanate battery, a lithium-ion battery, or a lithium-polymer battery). However, the types of the battery 11 used in the aerosol generating device 10000 are not limited thereto. For example, the battery 11 may also include an alkaline battery or a manganese battery.

The atomizer 12 receives power from the battery 11 under the control of the processor 16. The atomizer 12 may receive power from the battery 11 to atomize the aerosol generating material stored in the aerosol generating device 10000.

The atomizer 12 may be located in the main body of the aerosol generating device 10000. Alternatively, when the aerosol generating device 10000 includes the main body and the cartridge, the atomizer 12 may be located in one of the cartridge and the main body, or may extend from the main body to the cartridge or vice versa.

When the atomizer 12 is located in the cartridge, the atomizer 12 may receive power from the battery 11 located in at least one of the main body and the cartridge. In addition, when the atomizer 12 is divided and located in the main body and the cartridge, components that require power supply in the atomizer 12 may receive power from the battery 11 located in at least one of the main body and the cartridge.

The atomizer 12 generates an aerosol from the aerosol generating material inside the cartridge. The aerosol may mean a suspension in which liquid and/or solid fine particles are dispersed in a gas. That is, the aerosol generated from the atomizer 12 may be in a state in which vaporized particles generated from the aerosol generating material and air are mixed. For example, the atomizer 12 may convert a phase of the aerosol generating material into a gas phase through vaporization and/or sublimation. The atomizer 12 may also generate an aerosol by finely emitting an aerosol generating material in a liquid and/or solid phase.

For example, the atomizer 12 may generate an aerosol from the aerosol generating material by using an ultrasonic vibration method. The ultrasonic vibration method may refer to a method of generating an aerosol by atomizing an aerosol generating material with ultrasonic vibration generated by a vibrator.

Although not shown in FIG. 1, the atomizer 12 may include a heater capable of heating the aerosol generating material by generating heat. The aerosol generating material may be heated by the heater, resulting in the generation of the aerosol.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, and the like, but is not limited thereto. In addition, the heater may be implemented as a metal heating wire, a metal heating plate on which an electrically conductive track is arranged, a ceramic heating element, and the like, but is not limited thereto.

For example, in one embodiment, the heater may be a part of the cartridge 2000. Also, the cartridge 2000 may include liquid delivery unit and a liquid storage unit, which are described later. The aerosol producing material accommodated in the liquid storage unit is moved to the liquid delivery unit, and the heater may heat the aerosol generating material absorbed by the liquid delivery unit to generate an aerosol. For example, the heater may be wound around the liquid delivery unit or arranged adjacent the liquid delivery unit.

As another example, the aerosol generating device 10000 may include an accommodation space capable of accommodating a cigarette, and the heater may heat the cigarette inserted into the accommodation space of the aerosol generating device 10000. As the cigarette is accommodated in the accommodation space of the aerosol generating device 10000, the heater may be inside and/or outside the cigarette. Thus, the heater may heat the aerosol generating material in the cigarette to generate an aerosol.

On the other hand, the heater may be an induction heating type heater. The heater may include an electrically-conductive coil for heating cigarette or cartridge in an induction heating manner, and the cigarette or cartridge may include a susceptor that may be heated by the induction heating type heater.

The aerosol generating device 10000 may include at least one sensor 13. A result sensed by the at least one sensor 13 may be transmitted to the processor 16, and depending on the sensing result, the processor 16 may control the aerosol generating device 10000 to perform various functions such as operation control of the atomizer 12, restriction of smoking, determination of whether cartridge (or cigarette) is inserted or not, display of a notification, and the like.

For example, at least one sensor 13 may include a puff detection sensor. The puff detection sensor may detect the user's puff based on at least one of a change in a flow rate of an externally introduced air flow, a change in pressure, and a detection of a sound. The puff detection sensor may detect a start time and an end time of the user's puff, and the processor 16 may determine a puff period and a non-puff period depending on the detected start time and the detected end time of the puff.

Also, the at least one sensor 13 may include a user input sensor. The user input sensor may be a sensor capable of receiving a user input, such as a switch, a physical button, or a touch sensor. For example, when a user touches a predetermined area formed of a metal material, a change in capacitance occurs, and the touch sensor may be a capacitive sensor capable of detecting a user's input by detecting the change in capacitance. The processor 16 may determine whether a user's input has occurred by comparing the value before and after the change of the capacitance received from the capacitive sensor. When the value before and after the change of capacitance exceeds a preset threshold, the processor 16 may determine that the user's input has occurred.

Also, the at least one sensor 13 may include a motion sensor. Information about the movement of the aerosol generating device 10000, such as inclination, moving speed, and acceleration of the aerosol generating device 10000, may be acquired through the motion sensor. For example, the motion sensor may measure information about a state in which the aerosol generating device 10000 moves, a stationary state of the aerosol generating device 10000, a state in which the aerosol generating device 10000 is inclined at an angle within a predetermined range for the puff, and an angle of the aerosol generating device 10000 between each puff motion. The motion sensor may measure motion information of the aerosol generating device 10000 using various methods. For example, the motion sensor may include an acceleration sensor capable of measuring acceleration in three directions, an x-axis, a y-axis, and a z-axis, and a gyro sensor capable of measuring angular velocity in the three directions.

Also, the at least one sensor 13 may include a proximity sensor. The proximity sensor refers to a sensor that detects an approaching object, or the presence or distance of an object existing in the vicinity without mechanical contact and using the force of an electromagnetic field or infrared rays, etc. The proximity sensor may detect whether the user approaches the aerosol generating device 10000.

Also, the at least one sensor 13 may include an image sensor. The image sensor may include, for example, a camera for obtaining an image of an object. The image sensor may recognize an object based on the image obtained by the camera. The processor 16 may analyze the image obtained through the image sensor to determine whether the user is in a situation to use the aerosol generating device 10000. For example, when the user approaches the aerosol generating device 10000 near the lips of the user to use the aerosol generating device 10000, the image sensor may obtain an image of the lips. The processor 16 may analyze the obtained image, and determine that the user is in a situation to use the aerosol generating device 10000 when the obtained image is de-termined as the lips. Based on this determination, the aerosol generating device 10000 may operate the atomizer 12 in advance or preheat the heater.

In addition, the at least one sensor 13 may include a consumable detachment sensor capable of detecting installation or removal of consumables (e.g., cartridge, cigarette, etc.) that may be used in the aerosol generating device 10000. For example, the consumable detachment sensor may detect whether the consumable has been in contact with the aerosol generating device 10000 or may determine whether the consumable is detached by the image sensor. In addition, the consumable detachment sensor may be an inductance sensor that detects a change in an inductance value of a coil that may interact with a marker of the consumable, or may be a capacitance sensor that detects a change in the capacitance value of the capacitor that may interact with the marker of the consumable.

In addition, the at least one sensor 13 may include a temperature sensor. The temperature sensor may sense the temperature at which the heater (or the aerosol generating material) of the atomizer 12 is heated. The aerosol generating device 10000 may include a temperature sensor for sensing the temperature of the heater, or the heater itself may serve as the temperature sensor. Alternatively or additionally, a separate temperature sensor may be further included in the aerosol generating device 10000 when the heater itself functions as a temperature sensor. In addition, the temperature sensor may sense the temperature of internal components such as a printed circuit board (PCB) and a battery of the aerosol generating device 10000 as well as the heater.

In addition, the at least one sensor 13 may include various sensors that measure information on the surrounding environment of the aerosol generating device 10000. For example, the at least one sensor 13 may include a temperature sensor that may measure the temperature of the surrounding environment, a humidity sensor that measures the humidity of the surrounding environment, and an atmospheric pressure sensor that measures the pressure of the surrounding environment.

The sensor 13 that may be provided in the aerosol generating device 10000 is not limited to the above-described types, and may further include various sensors. For example, the aerosol generating device 10000 may include a fingerprint sensor capable of obtaining fingerprint information from a user's finger for user authentication and security, an iris recognition sensor for analyzing the iris pattern of the pupil, a vein recognition sensor that detects the amount of infrared absorption of reduced hemoglobin in veins from images taken from the palm, a facial recognition sensor that recognizes feature points such as eyes, nose, mouth and facial contours in 2D or 3D manner, and radio-frequency identification (RFID) sensor.

In the aerosol generating device 10000, only one or some of the examples of the various sensors 13 provided above may be selected and implemented. In other words, the aerosol generating device 10000 may combine and utilize information sensed by at least one of the above-described sensors.

The user interface 14 may provide the user with information about the state of the aerosol generating device 10000. The user interface 14 may include various interfacing means such as a display or lamp for outputting visual information, a motor for outputting tactile information, a speaker for outputting sound information, terminals for data communication with input/output (I/O) interfacing means (e.g., button or touch screen) which receives information input from a user or outputs information to a user, or for receiving charging power, and communication interfacing module for performing wireless communication with external devices (e.g., Wi-Fi, Wi-Fi direct, Bluetooth, Near-Field Communication (NFC), etc.)

However, in the aerosol generating device 10000, only one or some of the various user interface 14 examples provided above may be selected and implemented.

The memory 15 is hardware for storing various data processed in the aerosol generating device 10000, and may store data processed and data to be processed by the processor 16. The memory 15 may be implemented in various types such as random access memory (RAM) including dynamic random access memory (DRAM) and static random access memory (SRAM), read-only memory (ROM), and electrically erasable programmable read-only memory (EEPROM).

The memory 15 may store the operating time of the aerosol generating device 10000, a maximum number of puffs, a current number of puffs, at least one temperature profile, and data on the user's smoking pattern.

The processor 16 controls the overall operation of the aerosol generating device 10000. The processor 16 may be implemented as an array of a plurality of logic gates, or may be implemented as a combination of a general-purpose microprocessor and a memory in which a program executable by the microprocessor is stored. In addition, it may be understood by those skilled in the art that the processor 16 may be implemented with other types of hardware.

The processor 16 analyzes the result sensed by the at least one sensor 13 and controls processes to be subsequently performed.

The processor 16 may control power supply to the atomizer 12 to start or end the operation of the atomizer 12 based on the result sensed by the at least one sensor 13. In addition, the processor 16 may control the amount of power supplied to the atomizer 12 and the time at which the power is supplied so that the atomizer 12 may generate an appropriate amount of aerosol, based on the result sensed by the at least one sensor 13. For example, The processor 16 may control the electrical energy (e.g., current or voltage) supplied to the vibrator so that the vibrator of the atomizer 12 vibrates at a predetermined frequency.

In one embodiment, the processor 16 may start the operation of the atomizer 12 after receiving a user input for the aerosol generating device 10000. In addition, the processor 16 may start the operation of the atomizer 12 after detecting the user's puff using the puff detection sensor. Further, after counting the number of puffs using the puff detection sensor, the processor 16 may stop supplying power to the atomizer 12 when the number of puffs reaches a preset number.

The processor 16 may control the user interface 14 based on a result sensed by the at least one sensor 13. For example, after counting the number of puffs using the puff detection sensor, when the number of puffs reaches the preset number, the processor 16 may use at least one of a lamp, a motor, and a speaker to inform the user that the aerosol generating device 10000 will be terminated soon.

On the other hand, although not shown in FIG. 1, the aerosol generating device 10000 may be included in the aerosol generating system together with a separate cradle. For example, the cradle may be used to charge the battery 11 of the aerosol generating device 10000. For example, the aerosol generating device 10000 may receive power from the battery of the cradle and charge the battery 11 of the aerosol generating device 10000 while being accommodated in the accommodating space inside the cradle.

The one or more embodiments may also be implemented in the form of a recording medium including instructions executable by a computer, such as a program module executable by a computer. A computer-readable medium may be any available media that may be accessed by a computer and includes both volatile and nonvolatile media, and removable and non-removable media. In addition, the computer-readable medium may include a computer storage medium and a communication medium. The computer storage includes both volatile and nonvolatile, and removable and non-removable media implemented in any method or technology for storage of information such as computer readable instructions, data structures, program modules or other data. Communication medium may include computer readable instructions, data structures, other data in non-transitory data signals, such as program modules.

FIG. 2 is a diagram schematically illustrating an aerosol generating device according to an embodiment.

An aerosol generating device 10000 according to the embodiment shown in FIG. 2 includes a cartridge 2000 including an aerosol generating material, and a main body 1000 supporting the cartridge 2000.

The cartridge 2000 may be coupled to the main body 1000 in a state in which the aerosol generating material is accommodated therein. For example, a portion of the cartridge 2000 may be inserted into the main body 1000, or a portion of the main body 1000 may be inserted into the cartridge 2000, such that the cartridge 2000 may be mounted on the main body 1000. In this case, the main body 1000 may maintain a state coupled to the cartridge 2000 by a snap-fit method, a screw coupling method, a magnetic coupling method, an interference fit method, etc., but the method in which the main body 1000 is coupled to the cartridge 2000 is not limited to the above description.

The cartridge 2000 may include a mouthpiece 2100. The mouthpiece 2100 may be formed on a side opposite to a portion coupled to the main body 1000, and may be a portion inserted into the user's oral cavity. The mouthpiece 2100 may include a discharge hole 2110 for discharging the aerosol generated from the aerosol generating material inside the cartridge 2000 to the outside.

The cartridge 2000 may hold an aerosol-generating material having any one state, such as a liquid state, a solid state, a gaseous state, or a gel state, for example. The aerosol generating material may include a liquid composition. For example, the liquid composition may be a liquid including a tobacco-containing material including a volatile tobacco flavor component, or may be a liquid including a non-tobacco material.

The liquid composition may include, for example, any one of water, a solvent, ethanol, a plant extract, spices, a flavorings, and a vitamin mixture, or a mixture thereof. The spices may include menthol, peppermint, spearmint oil, various fruit flavoring ingredients, and the like, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. The nicotine salts may be formed by adding acids including organic or inorganic acids, to nicotine. Nicotine may be a naturally generated nicotine or synthetic nicotine, and may have any weight con-centration relative to the total solution weight of the liquid composition.

The acid for the formation of the nicotine salt may be appropriately selected in consideration of the blood nicotine absorption rate, the operating temperature of the aerosol generating device 10000, flavors or tastes, solubility, and the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 2000 may include a liquid storage unit 2200 for accommodating an aerosol generating material therein. The liquid storage unit 2200 accommodating the aerosol generating material may mean that the liquid storage unit 2200 performs a function of containing the aerosol generating material, such as a container, and the liquid storage unit 2200 may include an element impregnating (or containing) the aerosol generating material such as, for example, sponges, cotton or cloth, or porous ceramic structures therein.

The aerosol generating device 10000 may include an atomizer that converts the phase of the aerosol generating material inside the cartridge 2000 to generate an aerosol.

For example, the atomizer of the aerosol generating device 10000 may convert the phase of the aerosol generating material by using an ultrasonic vibration method of atomizing the aerosol generating material with ultrasonic vibration. The atomizer may include a vibrator 1300 that generates ultrasonic vibrations, a liquid delivery unit 2400 that absorbs the aerosol generating material and maintains the absorbed aerosol generating material in an optimal state for converting into an aerosol, and a vibration accommodating unit 2300 for generating an aerosol by transmitting ultrasonic vibrations to the aerosol generating material of the liquid delivery unit.

The vibrator 1300 may generate vibration for a short period. The vibration generated by the vibrator 1300 may be ultrasonic vibration, and the frequency of the ultrasonic vibration may be, for example, 100 kHz to 3.5 MHZ. By the short-period vibration generated from the vibrator 1300, the aerosol generating material may be vaporized and/or atomized into an aerosol.

The vibrator 1300 may include, for example, piezoelectric ceramics, and the piezoelectric ceramics are functional materials that may convert electricity to mechanical forces by generating electricity (voltage) by physical force (pressure) and generating vibration (mechanical force) when electricity is applied. Therefore, the vibration (physical force) is generated by the electricity applied to the vibrator 1300, and such small physical vibrations may split the aerosol generating material into small particles and atomize the aerosol generating material into an aerosol.

The vibrator 1300 may be electrically connected to a circuit by a pogo pin or a C-clip. Accordingly, the vibrator 1300 may generate vibration by receiving a current or voltage from the pogo pin or the C-clip. However, the type of element connected to supply current or voltage to the vibrator 1300 is not limited to the above description.

The vibration accommodating unit 2300 may receive the vibration generated from the vibrator 1300 and convert the aerosol generating material transmitted from the liquid storage unit 2200 into an aerosol.

The liquid transfer unit 2400 may transfer the liquid composition of the liquid storage unit 2200 to the vibration accommodating unit 2300. For example, the liquid delivery unit 2400 may be a wick including at least one of cotton fiber, ceramic fiber, glass fiber, and porous ceramic, but is not limited thereto.

The atomizer may also be implemented as a mesh or plate-shaped vibration accommodating unit that performs both a function of absorbing and maintaining the aerosol generating material in an optimal state for conversion into an aerosol without using a separate liquid transfer means and a function of generating an aerosol by transmitting vibration to the aerosol generating material.

In addition, in the embodiment shown in FIG. 2, the vibrator 1300 of the atomizer is arranged in the main body 1000, and the vibration accommodating unit 2300 and the liquid delivery unit 2400 are arranged in the cartridge 2000, but is not limited thereto. For example, the cartridge 2000 may include the vibrator 1300, the vibration accommodating portion 2300, and a liquid delivery unit 2400, and when a portion of the cartridge 2000 is inserted into the main body 1000, the main body 1000 may provide power to the cartridge 2000 through a terminal (not shown) or supply a signal related to the operation of the cartridge 2000 to the cartridge 2000, through which the operation of the vibrator 1300 may be controlled.

The liquid storage unit 2200 of the cartridge 2000 may include a transparent material at least in part so that the aerosol generating material accommodated in the cartridge 2000 may be visually seen from the outside. The mouthpiece 2100 and the liquid storage unit 2200 may be entirely made of transparent plastic or glass, and only a portion of the liquid storage unit 2200 may be made of a transparent material.

The cartridge 2000 of the aerosol generating device 10000 may include an aerosol discharge passage 2500 and an airflow passage 2600.

The aerosol discharge passage 2500 may be formed in the liquid storage unit 2200 to be in fluid communication with the discharge hole 2110 of the mouthpiece 2100. Therefore, the aerosol generated by the atomizer may move along the aerosol discharge passage 2500, and may be delivered to the user through the discharge hole 2110 of the mouthpiece 2100.

The airflow passage 2600 is a passage through which external air may be introduced into the aerosol generating device 10000. The external air introduced through the airflow passage 2600 may be introduced into the aerosol discharge passage 2500 or may be introduced into a space in which an aerosol is generated. Accordingly, the introduced external air may be mixed with vaporized particles generated from the aerosol generating material to generate an aerosol.

For example, as shown in FIG. 2, the airflow passage 2600 may be formed to surround the outside of the aerosol discharge passage 2500. Therefore, the shape of the aerosol discharge passage 2500 and the air flow passage 2600 may be a double tube type in which the aerosol discharge passage 2500 is arranged inside and the air flow passage 2600 is arranged outside of the aerosol discharge passage 2500. Thus, the external air may be introduced in the direction opposite to the direction in which the aerosol moves in the aerosol discharge passage 2500.

However, the structure of the airflow passage 2600 is not limited to the above description. For example, the airflow passage may be a space formed between the main body 1000 and the cartridge 2000 when the main body 1000 and the cartridge 2000 are combined and in fluid communication with the atomizer.

In the aerosol generating device 10000 according to the above-described embodiment, a cross-sectional shape in a direction transverse to the longitudinal direction of the main body 1000 and the cartridge 2000 may be an approximately circular, oval, square, rectangular, or polygonal cross-sectional shape of various shapes. However, the cross-sectional shape of the aerosol generating device 10000 is not limited to the above description, and the aerosol generating device 10000 is not necessarily limited to a structure extending in a straight line when extending in the longitudinal direction. For example, the cross-sectional shape of the aerosol generating device 10000 may be curved in a streamline shape for a user to easily hold by hand or be bent at a predetermined angle in a specific area and extending long, and the cross-sectional shape of the aerosol generating device 10000 may change along the longitudinal direction.

FIG. 3A is an exploded perspective view of a vibrator structure according to an embodiment, and FIG. 3B is a cross-sectional view of the vibrator structure of FIG. 3A.

Referring to FIGS. 3A and 3B, a vibrator structure 10 according to an embodiment may include a vibrator 100, a first electrode 111, a second electrode 121, and a metal body 200, and may further include a lower electrode 300. The vibrator structure 10 may be included in a cartridge or the main body to atomize the aerosol generating material delivered from the outside of the vibrator structure 10.

The vibrator 100 is vibrated according to applied electrical energy. For example, the vibrator 100 may receive electrical energy through the second surface 120 opposite to the first surface 110. The vibrator 100 may vibrate at a specific intensity, a specific frequency, and a specific mode based on at least one of an intensity, a frequency, and an electric field direction of the applied electrical energy.

The vibrator 100 may have a plate shape. For example, the vibrator 100 may have a disk shape or a square plate shape, but is not limited thereto, and may have a cylindrical shape.

The first electrode 111 may be arranged on the first surface 110 of the vibrator 100, and the second electrode 121 may be arranged on the second surface 120 of the vibrator 100. For example, when the vibrator 100 has a disk shape, the first surface 110 may be an upper surface, and the second surface 120 may be a lower surface.

By disposing the first electrode 111 and the second electrode 121 on opposite sides of the vibrator 100 to each other, an electric field in a direction perpendicular to the first surface 110 and the second side 120 of the vibrator 100 may be formed in the vibrator 100 to which the electrical energy is applied, and accordingly, the vibrating direction of the vibrator 100 may be perpendicular to the first surface 110 and the second surface 120.

For example, the vibration direction of the vibrator 100 may be a direction perpendicular to the first surface 110 and the second surface 120. However, the vibration direction of the vibrator 100 is not limited thereto, and depending on the shape of the vibrator 100, the vibrator 100 may vibrate in a direction horizontal to the first surface 110 and the second surface 120.

The first electrode 111 and the second electrode 121 may be made of a material having high electrical conductivity. For example, the first electrode 111 and the second electrode 121 may be formed of any one of silver (Ag), copper (Cu), gold (Au), aluminum (Al), tungsten (W), iron (Fe), platinum (Pt), and lead (Pb). For example, the first electrode 111 and the second electrode 121 may be formed by applying silver paste to the first surface 110 and the second surface 120 of the vibrator 100, respectively.

According to one embodiment, the first electrode 111 and the second electrode 121 may be arranged on at least one region of the first surface 110 and the second surface 120, respectively. For example, the first electrode 111 may be arranged on the entire area of the first surface 110.

As another example, the first electrode 111 may be arranged on the entire area except for at least one area of the first surface 110. For example, the first electrode 111 may be formed of silver paste applied to the entire area except for at least a portion of the edge of the first surface 110.

According to another embodiment, the first electrode 111 may be arranged along an edge of the first surface 110. As an example, the first electrode 111 may be arranged on the entire edge of the first surface 110. As another example, the first electrode 111 may be arranged on a portion of the edge of the first surface 110. Here, the first electrode 111 being arranged along the edge of the first surface 110 may mean that the first electrode 111 is not only arranged on the edge of the first surface 110, but also that the first electrode 111 is arranged on a wider area including the edge.

The second electrode 121 may be at a position spaced apart from the edge of the second surface 120 in a direction toward the center. For example, the second electrode 121 may be at the center of the second surface 120 of the vibrator 100. As another example, the second electrode 121 may be arranged in a circular band shape at a location spaced apart from the center of the vibrator 100 by a predetermined distance. Here, "the second electrode 121 is arranged at a position spaced apart from the edge of the second surface 120 in a direction toward the center" may mean that the second electrode 121 is not only arranged in the center of the second surface 120, but also that the second electrode 121 is arranged on a wider area including the center.

The positions at which the first electrode 111 and the second electrode 121 are arranged are not limited to those described above, and those of ordinary skill in the art to which the present embodiment pertains will understand that other positions capable of forming electrodes on both surfaces of the vibrator 100 may be further included.

The metal body 200 may accommodate the vibrator 100, and may come in contact with at least one region of the first electrode 111 to transmit the electrical energy applied from the outside of the vibrator structure 10 to the first electrode 111, or be transmitted from the first electrode 111. For example, the metal body 200 may have a structure surrounding at least a portion of the vibrator 100 while exposing at least a portion of the vibrator 100 to the outside of the metal body 200.

According to one embodiment, the metal body 200 may include a sidewall 220 forming a hollow accommodating the vibrator 100 and an upper electrode 210 in contact with the first electrode 111 of the vibrator 100. For example, the metal body 200 may have a cylindrical structure including a sidewall 220, and the upper electrode 210 may have a structure that protrudes from the sidewall 220 toward the center of the first surface 110.

In this case, the vibrator 100 may be inserted into the sidewall 220 of the metal body 200, the first surface 110 of the vibrator 100 may be in contact with the upper electrode 210 of the metal body 200 so that the vibrator 100 may be electrically connected to the metal body 200, and at least a portion of the first surface 110 of the vibrator 100 may be exposed to the outside of the metal body 200.

According to another embodiment, the metal body 200 may be a cylindrical cap structure. Here, the upper surface of the cap may form the upper electrode 210, and the sidewall of the cap may form the sidewall 220. The vibrator 100 may be inserted into the metal body 200 so that the first electrode 111 of the vibrator 100 and the upper electrode 210 of the metal body 200 contact each other.

A through-hole 230 may be formed in the upper surface of the metal body 200, such that the through-hole 230 exposes the inside of the metal body 200, and a diameter of the through-hole 230 is smaller than a diameter of the cylindrical vibrator 100. The aerosol generated by the vibrator 100 may move to the outside of the vibrator structure through the through-hole 230.

The vibrator 100 may be coupled by interference fit between the outer peripheral surface of the vibrator 100 and the inner peripheral surface of the side wall 220 of the metal body 200, or the bonding between the vibrator 100 and the metal body 200 may be maintained by an adhesive material. In addition, the vibrator 100 may be coupled to the metal body 200 together with other components to be described later to maintain the coupling with the metal body 200.

The metal body 200 may be made of a conductive material. For example, the metal body 200 may be made of stainless steel or aluminum, but is not limited thereto, and other electrically conductive materials may also be used for manufacturing the metal body 200.

The lower electrode 300 may be in contact with the second electrode 121 of the vibrator 100 to receive the electrical energy applied from the outside of the vibrator structure 10 from the second electrode 121 or to transfer the electrical energy to the second electrode 121. The lower electrode 300 may have, for example, a columnar structure. The lower electrode 300 may not only be electrically connected to the second electrode 121 of the vibrator 100, but also support the vibrator 100 on the second surface 120 of the vibrator 100.

For example, the lower electrode 300 may have a structure in which the size of the diameter varies depending on the height. Such a structure may facilitate coupling of the lower electrode 300 with other components. The lower electrode 300 may be made of an electrically conductive material such as gold, silver, copper, or the like, or may be made of the same material as the metal body 200.

According to embodiments, in the upper electrode 210 and the lower electrode 300 connected to the vibrator 100, the metal body 200 or the upper electrode 210 may be a positive electrode (+), and the lower electrode 300 may be a negative electrode (−). Conversely, the metal body 200 or the upper electrode 210 may be a negative electrode (−), and the lower electrode 300 may be a positive electrode (+).

As described above, the upper electrode 210, the vibrator 100, and the lower electrode 300 are parts of an electric circuit, and may be connected to an external power source that supplies electrical energy to the electric circuit.

The vibrator structure 10 according to an embodiment may be modularized by including a vibrator 100, a metal body 200 or an upper electrode 210 which is electrically connected to the first electrode 111, and a lower electrode 300 electrically connected to the second electrode 121. Accordingly, the vibrator 100 positioned inside the metal body 200 may not only have stability against external impact, but also simplify the electrical wiring for supplying electrical energy at the same time.

FIG. 4A is an exploded perspective view of the vibrator structure according to another embodiment, and FIG. 4B is a cross-sectional view of the vibrator structure of FIG. 4A.

Referring to FIGS. 4A and 4B, a vibrator structure 10 according to another embodiment may include a vibrator 100, a metal body 200, a first electrode 111, a second electrode 121, a lower electrode 300, elastic bodies 400 and 500, a pressing body 550, and a support body 600.

The vibrator structure 10 shown in FIGS. 4A and 4B may be a vibrator structure 10 in which the elastic bodies 400 and 500, the pressing body 550, and the support body 600 are added to the vibrator structure 10 of FIGS. 3A and 3B, and hereinafter, de-scriptions already given in FIGS. 3A and 3B are omitted, and additional components are described in detail.

The metal body 200 in contact with the vibrator 100 may vibrate by receiving vibration from the vibrator. As the metal body 200 vibrates together, the vibration efficiency of the vibrator 100 may decrease, and because the vibrator structure 10 as a whole vibrates, inconvenience may be provided to the user of the aerosol generating device including the vibrator structure 10. Accordingly, a structural design for preventing or reducing the overall vibration of the vibrator structure 10 may be necessary.

The elastic body may be coupled with the metal body 200 to receive the vibration of the vibrator 100 and absorb the vibration of the metal body 200. The elastic body, for example, may be made of any one of rubber, silicone, synthetic resin, and a porous material, but is not limited thereto, and may be made of any other material capable of absorbing or attenuating the vibration transmitted to the metal body 200.

According to one embodiment, the elastic body may include a first elastic body 400 coupled to an upper side of the metal body 200 and a second elastic body 500 coupled to a lower side of the metal body 200. For example, the first elastic body 400 may be arranged to surround at least a portion of the outer surface of the metal body 200, and the second elastic body 500 may be arranged to surround at least a portion of the inner surface of the metal body 200.

The first elastic body 400 may be coupled to the metal body 200 in an interference fit or snap-fit manner, and the second elastic body 500 may also be coupled to the metal body 200 in an interference fit or snap-fit manner. Accordingly, the metal body 200 and the first elastic body 400 and the second elastic body 500 may be coupled without a separate fastening element, so that the disassembly and assembly of the vibrator structure 10 may be facilitated.

The coupling method between the elastic body and the metal body 200 is not limited to the above-described examples, and a separate fastening element such as a coupling screw or a key may be used.

According to one embodiment, the first elastic body 400 may include a hole portion 410 exposing at least a portion of a first surface 110 of the vibrator 100 accommodated in the metal body 200 to the outside. The hole portion 410 may communicate with a discharge passage through which the fluid moves to the outside in the aerosol generating device. Accordingly, the aerosol generated by the vibrator 100 may move to the outside of the vibrator structure 10 through the hole portion 410, and further, may move along the discharge passage to be discharged to the outside of the aerosol generating device.

The second elastic body 500 may contact at least a portion of a second surface 120 of the vibrator 100. For example, the vibrator 100 may be between the upper electrode 210 of the metal body 200 and the second elastic body 500, and may be pressed in a direction from the lower electrode 300 toward the upper electrode 210 by the second elastic body 500. Accordingly, the electrical contact between the vibrator 100 and the metal body 200 may be more robust, and the electrical energy flowing along the vibrator 100 and the metal body 200 may be more smoothly transmitted.

According to another embodiment, the metal body 200 is coaxially coupled to the first elastic body 400 and the second elastic body 500 in a direction parallel to the direction from the first surface 110 toward the second surface 120 of the vibrator 100. For example, the metal body 200, the first elastic body 400, and the second elastic body 500 may be manufactured to have the same cross-sectional shape when viewed from a direction perpendicular to the first surface 110 and the second surface 120 of the vibrator 100. Accordingly, the metal body 200 may be coupled to the inside of the first elastic body 400, and the second elastic body 500 may be coupled to the inside of the metal body 200.

For example, the metal body 200, the first elastic body 400, and the second elastic body 500 may have a substantially cylindrical shape, and may be coupled in such a way that three cylinders having different diameters are arranged on each other.

The pressing body 550 may contact at least a portion of the vibrator 100 and the lower electrode 300 to maintain contact between the vibrator 100 and the lower electrode 300. For example, the pressing body 550 may be made of a rubber or silicone material, and may be in close contact with at least a portion of the second surface 120 or the second electrode 121 of the vibrator 100 and in close contact with at least a portion of the outer surface of the lower electrode 300, so that the contact between the second electrode 121 and the lower electrode 300 may be firmly maintained by the pressing of the pressing body 550.

In one embodiment, the pressing body 550 may be positioned inside the second elastic body 500 coupled to the inside of the metal body 200, and may have a structure surrounding the lower electrode 300. In another embodiment, the pressing body 550 may be integrally formed with the second elastic body 500 and may have a structure surrounding the lower electrode 300.

In another embodiment, the pressing body 550 and the lower electrode 300 may be manufactured to interlock with each other. For example, as shown in FIG. 4B, the lower electrode 300 and the pressing body 550 are manufactured to have a stepped structure in cross section, so that they may be firmly coupled to each other. Accordingly, the contact between the lower electrode 300 and the second electrode 121 may not be easily separated.

The support 600 may support the metal body 200. For example, the support 600 may be positioned on the opposite side of the side on which the upper electrode 210 of the metal body 200 is positioned to support the metal body 200. Specifically, the upper surface of the support 600 may contact the lower surface of the metal body 200 to provide a reaction force to the lower surface of the metal body 200.

The support 600 may support other components positioned inside the metal body 200. For example, the support 600 may support the first elastic body 400 and/or the second elastic body 500 coupled to the metal body 200.

In one embodiment, the support body 600 may be a structure surrounding at least a portion of the outer surface of the second elastic body 500 or the pressing body 550. In another embodiment, at least a portion of the outer surface of the support 600 may be a structure that engages with at least a portion of the outer surface of the second elastic body 500 and/or the pressing body 550, and the support 600 and the second elastic body 500 and/or the support 600 and the pressing body 550 may be coupled to each other in an interference fit manner.

The second elastic body 500 and the pressing body 550 coupled to the support 600 are firmly coupled to the metal body 200, so that the coupling between the support 600 and the metal body 200 may also be firmly maintained. In addition, the pressing body 550 coupled to the support 600 may maintain the coupling between the lower electrode 300 and the vibrator 100. Accordingly, organic coupling between the components included in the vibrator structure 10 may be firmly formed.

According to one embodiment, the support 600 includes a conductive portion 610 connected to the metal body 200, and may support the metal body 200. For example, the conductive portion of the support 600 may be electrically connected to the metal body 200 at one end 221 of the sidewall 220 of the metal body 200.

In one embodiment, a part of the support 600 may be made of an insulator (e.g., rubber, synthetic resin, plastic), and the remaining part may be the conductive portion 610 made of an electrically conductive material. In another embodiment, the support 600 may be entirely made of an electrically conductive material, and may perform the function of the conductive portion 610 for supporting the metal body 200 and transmitting electrical energy to the metal body 200 at the same time.

One side of the conductive portion 610 may be electrically connected to the metal body 200, and the other side opposite to the one side may be electrically connected to an external power source of the vibrator structure 10. Specifically, one side of the conductive portion 610 may be on the upper surface of the support 600, and the other side of the conductive portion 610 may be on the lower surface of the support 600.

As the support 600 includes the conductive portion 610, the electrical energy passing through the metal body 200 may be transmitted to the outside of the vibrator structure 10, or electric energy applied from the outside of the vibrator structure 10 may be transmitted to the metal body 200.

According to one embodiment, the support 600 may further include a through hole 620 that allows an external terminal for supplying electrical energy to be connected to the lower electrode. As an example, as shown in FIG. 4B, the through hole 620 may be in the center of the support 600, and one end of the lower electrode 300 may be in the through hole 620.

As another example, an external terminal may be inserted through the through hole 620 so that the external terminal may be connected to the lower electrode 300. The external terminal may include, for example, at least one of a pogo pin, a C-clip, and an FPCB. As the external terminal is inserted into the through hole 620, the external terminal and the lower electrode 300 are electrically connected to each other, and thus electrical energy may be applied to the vibrator structure 10.

As such, the support 600 may be at the one end 221 of the metal body 200 to support the metal body 200 and components inside the metal body 200. In addition, the vibrator structure 10 may be connected to an external power source and/or an external terminal through the support 600. Accordingly, an electric circuit through which electric energy may be transmitted may be formed along the conductive portion 610 of the support 600, the metal body 200, the vibrator 100, the lower electrode 300, and the external terminal.

In the vibrator 100 connected to the support 600 and the lower electrode 300 in contact with the metal body 200, the support 600 or the conductive portion 610 may be a positive electrode (+), and the lower electrode 300 may be a negative electrode (−). Alternatively, the support 600 or the conductive portion 610 may be a negative electrode (−), and the lower electrode 300 may be a positive electrode (+).

FIG. 5 is a view for describing the flow of heat in the vibrator structure according to an embodiment.

Referring to FIG. 5, the vibrator structure 10 according to an embodiment may include a vibrator 100, a first electrode 111, a second electrode 121, a metal body 200, a lower electrode 300, and a support body 600.

The vibrator structure 10 of FIG. 5 may be a vibrator structure in which a support 600 is added to the vibrator structure 10 of FIGS. 3A and 3B, and hereinafter, descriptions already given in FIGS. 3A and 3B are omitted.

Depending on the substance constituting the vibrator 100 or the material of the vibrator 100, an intrinsic characteristics of the vibrator 100 may vary, and even when made of the same substance or material, the intrinsic characteristics may vary depending on the temperature of the vibrator 100. Here, The intrinsic characteristic of the vibrator 100 may be, for example, a resonant frequency or an impedance.

In one embodiment, when the temperature of the vibrator 100 reaches a Curie temperature, at least one of a resonant frequency and an impedance of the vibrator 100 may be changed.

The Curie temperature of a material means the transition temperature at which a magnetic material changes from a ferromagnetism state to a paramagnetism state, or vice versa, and the Curie temperature of the vibrator 100 may be, for example, about 250° C. to about 300° C.

As electrical energy is continuously applied to the vibrator 100, heat may be generated by the vibrator 100 oscillating, and accordingly, the temperature of the vibrator 100 may continuously rise.

When the temperature of the vibrator 100 reaches the Curie temperature due to the continuous heat of the vibrator 100, the vibrator 100 may not operate normally due to a sudden change in impedance or resonance frequency. Accordingly, a heat dissipation structure or a thermal circulation structure of the vibrator structure 10 to prevent overheating of the vibrator 100 due to heat generated in the vibrator 100 may be necessary.

According to one embodiment, the metal body 200 and the support 600 may include a thermally conductive material to receive heat generated from the vibrator 100 to prevent overheating of the vibrator 100. For example, the metal body 200 and the support body 600 may include at least one of stainless steel, silver, copper, and aluminum, to receive heat from the vibrator 100.

The metal body 200 and the support 600 share heat generated from the vibrator 100 to prevent the temperature rise to the Curie temperature of the vibrator 100. For example, the heat generated from the vibrator 100 may be transferred along the "A direction", so that the heat of the vibrator 100 may be dissipated. Accordingly, the heat may be emitted to the outside of the vibrator 100, and as a result, overheating of the vibrator 100 is prevented, thereby ensuring stable and continuous operation of the vibrator 100.

As the mass and/or volume of the metal body 200 and/or the support 600 including the thermally conductive material increases, the metal body 200 and/or the support 600 may receive more heat from the vibrator 100, so that the overheat prevention efficiency of the vibrator 100 may be improved. Further, as the contact area between the vibrator 100 and the metal body 200 and/or the contact area between the metal body 200 and the support 600 increases, the heat transfer amount of the heat generated by the vibrator 100 may be improved, so that the heat dissipation efficiency of the vibrator 100 may be improved.

In one embodiment, an interface material for improving heat transfer rate may be applied to a position where the vibrator 100 contacts the metal body 200 or a position where the metal body 200 contacts the support 600. The interface material may be, for example, thermal grease, but is not limited thereto.

According to another embodiment, at least one of the metal body 200 and the support 600 may further include at least one cooling fin 630. For example, the at least one cooling fin 630 may be arranged along the circumference of the outer surface of the support 600, or may be arranged along the longitudinal direction (e.g., y-direction).

As the heat dissipation fins 630 are further included in the metal body 200 or the support 600, the heat transfer area with the outside of the vibrator structure 10 increases, so that the heat dissipation efficiency of the vibrator structure 10 may be improved.

FIG. 6A is a perspective view of an aerosol generating device including a cartridge according to an embodiment, and FIG. 6B is a cross-sectional view of a portion of the cartridge of FIG. 6A.

Referring to FIGS. 6A and 6B, an aerosol generating device 10000 according to an embodiment may include a cartridge 2000 including a vibrator structure 10 and a main body 1000.

The cartridge 2000 may include a liquid storage unit 20, a wick 30 for absorbing an aerosol generating material stored in a liquid storage unit 20, and a vibrator structure 10 atomizing the aerosol generating material supplied to a vibrator 100 through the wick. The vibrator structure 10 may include the vibrator 100 vibrating due to applied electrical energy. The vibrator 100 may include a first surface and a second surface opposite to the first surface, a first electrode arranged on at least one region of the first surface, a second electrode arranged on at least one region of the second surface, and a metal body 200 accommodating the vibrator 100 and being in contact with at least one region of the first electrode to transfer the electrical energy applied from the outside to the first electrode.

The vibrator structure 10 applied to the aerosol generating device 10000 of FIGS. 6A and 6B may be the same as the vibrator structure 10 of FIGS. 4A and 4B, and the vibrator structure of FIGS. 3A and 3B may be applied to the aerosol generating device 10000. Hereinafter, the description in relation to the vibrator structure 10 is omitted, and the cartridge 2000 and the aerosol generating device 10000 are mainly described.

The main body 1000 may include a battery 1100 for applying electrical energy to the cartridge 2000 and a processor 1200 for controlling the overall operation of the aerosol generating device 10000. In addition, the main body 1000 may include other components necessary for the operation of the aerosol generating device 10000. For example, the main body 1000 may include an external terminal (not shown) for electrically connecting the vibrator structure 10 included in the cartridge 2000 to the main body 1000.

The aerosol generating device 10000 may be implemented by combining the main body 1000 and the cartridge 2000. For example, while the cartridge 2000 is coupled to the main body 1000, an external terminal may be electrically connected to the vibrator structure 10. Accordingly, electrical energy is applied from the battery 1100 to the vibrator structure 10, and the processor 1200 controls the operation of the vibrator structure 10, so that the aerosol generating device 10000 may operate.

A mouthpiece 2100 may be at one end of the cartridge 2000, and a discharge passage 2500 through which the aerosol moves along the inside of the cartridge 2000 in the mouthpiece 2100 may be formed. In addition, the liquid storage unit 20, the wick 30, the vibrator structure 10, and an airflow passage (not shown) through which outside air is introduced may be inside the cartridge 2000.

The liquid storage unit 20 accommodates the aerosol generating material and may include a liquid passage 31 for supplying the aerosol generating material to the vibrator structure 10. For example, the liquid passage 31 may be between the liquid storage 20 and the vibrator structure 10.

The wick 30 may be positioned adjacent to the liquid passage 31 to deliver the aerosol generating material toward the vibrator 100. For example, the wick 30 may extend from the liquid passage 31 to the first surface 110 of the vibrator 100 to deliver the aerosol generating material present in the liquid storage unit 20 to the vibrator 100. The wick 30 may include, for example, cotton fiber, ceramic fiber, or melamine resin, but is not limited thereto.

As shown in FIG. 6B, a gap through which the wick 30 extend may be located in at least one region of a first elastic body 400. The wick 30 is in this gap and may be connected from the liquid passage 31 to the inside of the vibrator structure 10. That is, the aerosol generating material may move to the wick 30 through the liquid passage 31, and may be delivered to the vibrator 100 along the wick 30.

Those of ordinary skill in the art related to this embodiment understand that it may be implemented in a modified form without departing from the scope of the disclosure. Therefore, the embodiments of the disclosure should be considered as illustrative examples only, and should not be construed as limiting the scope of the disclosure. The scope of the present disclosure is described in the claims rather than the foregoing description, and any modifications, substitutions and improvements of the embodiments of the disclosure should be construed as being included in the present disclosure.

The invention claimed is:

1. A vibrator structure comprising:

a vibrator configured to vibrate according to an electrical energy applied to the vibrator, the vibrator comprising a first surface and a second surface opposite to the first surface;

a first electrode arranged on at least one region of the first surface;

a second electrode arranged on at least one region of the second surface;

a metal body having an outer surface and an inner surface, the inner surface of the metal body surrounding the vibrator and being in contact with at least one region of the first electrode;

a first elastic body coupled to the outer surface of the metal body to receive a vibration of the vibrator and absorb the vibration, the first elastic body including a hole portion exposing at least a portion of a surface of the vibrator;

a support supporting the metal body, the support comprising a conductive portion and an insulator;

a lower electrode in contact with the second electrode; and a pressing body in contact with at least a portion of the vibrator and the lower electrode, wherein the metal body comprises a side wall forming a hollow for accommodating the vibrator, the conductive portion of the support is electrically connected to the metal body at one end of the sidewall of the metal body, and the electrical energy applied from an external power source is transferred to the first electrode through the metal body.

2. The vibrator structure of claim 1, wherein the metal body comprises an upper electrode in contact with the first electrode.

3. The vibrator structure of claim 2, wherein the first electrode is arranged along an edge of the first surface, and wherein the upper electrode protrudes from the side wall in a direction toward a center of the first surface.

4. The vibrator structure of claim 1, wherein the second electrode is arranged at a position spaced apart from an edge of the second surface, and wherein the lower electrode is accommodated in the hollow.

5. The vibrator structure of claim 1, further comprising:

a second elastic body coupled to a lower portion of the metal body, wherein the first elastic body is coupled to an upper portion of the metal body.

6. The vibrator structure of claim 5, wherein the metal body is coaxially coupled to the first elastic body and the second elastic body in a direction from the first surface toward the second surface of the vibrator.

7. The vibrator structure of claim 1, wherein the support further comprises a through hole through which an external terminal and the lower electrode are connected.

8. The vibrator structure of claim 1, wherein the metal body comprises a thermally conductive material receiving heat generated from the vibrator.

9. The vibrator structure of claim 1, wherein the support comprises a thermally conductive material receiving heat generated from the vibrator.

10. The vibrator structure of claim 9, wherein the support further comprises at least one cooling fin on a surface of the support.

11. A cartridge comprising:

a liquid storage unit;

a wick for absorbing an aerosol generating material stored in the liquid storage unit; and a vibrator structure comprising:

a vibrator configured to vibrate according to an electrical energy applied to the vibrator, the vibrator comprising a first surface and a second surface opposite to the first surface;

a first electrode arranged on at least one region of the first surface;

a second electrode arranged on at least one region of the second surface;

a metal body having an outer surface and an inner surface, the inner surface of the metal body surrounding the vibrator and being in contact with at least one region of the first electrode;

a first elastic body coupled to the outer surface of the metal body to receive a vibration of the vibrator and absorb the vibration, the first elastic body including a hole portion exposing at least a portion of a surface of the vibrator;

a support supporting the metal body, the support comprising a conductive portion and an insulator;

a lower electrode in contact with the second electrode; and a pressing body in contact with at least a portion of the vibrator and the lower electrode, wherein the metal body comprises a side wall forming a hollow for accommodating the vibrator, the conductive portion of the support is electrically connected to the metal body at one end of the sidewall of the metal body, and the electrical energy applied from an external power source is transferred to the first electrode through the metal body, and the vibrator structure atomizes the aerosol generating material supplied to the vibrator through the wick.

12. An aerosol generating device comprising:

a cartridge comprising a liquid storage unit;

a wick for absorbing an aerosol generating material stored in the liquid storage unit;

a battery for applying an electrical energy to the cartridge; and a vibrator structure comprising:

a vibrator configured to vibrate according to the electrical energy applied to the vibrator, the vibrator comprising a first surface and a second surface opposite to the first surface;

a first electrode arranged on at least one region of the first surface;

a second electrode arranged on at least one region of the second surface;

a metal body having an outer surface and an inner surface, the inner surface of the metal body surrounding the vibrator and being in contact with at least one region of the first electrode;

a first elastic body coupled to the outer surface of the metal body to receive a vibration of the vibrator and absorb the vibration, the first elastic body including a hole portion exposing at least a portion of a surface of the vibrator;

a support supporting the metal body, the support comprising a conductive portion and an insulator;

a lower electrode in contact with the second electrode; and a pressing body in contact with at least a portion of the vibrator and the lower electrode, wherein the metal body comprises a side wall forming a hollow for accommodating the vibrator, the conductive portion of the support is electrically connected to the metal body at one end of the sidewall of the metal body, and the electrical energy applied from the battery is transferred to the first electrode, and the vibrator structure atomizes the aerosol generating material supplied to the vibrator through the wick.

* * * * *